United States Patent
Shen et al.

(10) Patent No.: US 11,394,221 B2
(45) Date of Patent: Jul. 19, 2022

(54) METHOD AND SYSTEM FOR CONTROLLING DC BUS VOLTAGE

(71) Applicant: Delta Electronics, Inc., Taoyuan (CN)

(72) Inventors: Guoqiao Shen, Taoyuan (CN); Guojin Xu, Taoyuan (CN); Changliang Liu, Taoyuan (CN); Jian Li, Taoyuan (CN); Yunfeng Liu, Taoyuan (CN); Jinfa Zhang, Taoyuan (CN)

(73) Assignee: Delta Electronics, Inc., Taoyuan (TW)

(*) Notice: Subject to any disclaimer, the term of this patent is extended or adjusted under 35 U.S.C. 154(b) by 513 days.

(21) Appl. No.: 16/430,576

(22) Filed: Jun. 4, 2019

(65) Prior Publication Data

US 2019/0372380 A1    Dec. 5, 2019

(30) Foreign Application Priority Data

Jun. 5, 2018    (CN) .......................... 201810570503.0

(51) Int. Cl.
*H02J 7/00*   (2006.01)
*H02J 1/00*   (2006.01)

(52) U.S. Cl.
CPC .............. *H02J 7/0068* (2013.01); *H02J 1/00* (2013.01)

(58) Field of Classification Search
CPC .. H02J 7/0068; H02J 1/00; H02J 7/345; H02J 1/14
See application file for complete search history.

(56) References Cited

U.S. PATENT DOCUMENTS

| | | | | |
|---|---|---|---|---|
| 9,800,168 | B2* | 10/2017 | Zou | H02M 5/4585 |
| 10,978,876 | B2* | 4/2021 | Webb | H02J 7/35 |
| 2008/0148993 | A1* | 6/2008 | Mack | B60L 9/00 105/35 |
| 2014/0361621 | A1* | 12/2014 | Lindtjorn | H02H 7/268 307/38 |
| 2016/0241082 | A1* | 8/2016 | Stoevring | H02M 7/44 |
| 2016/0308362 | A1* | 10/2016 | Jung | H02J 3/381 |
| 2019/0044340 | A1* | 2/2019 | Jacobson | H02J 3/241 |
| 2020/0169089 | A1* | 5/2020 | Lee | H02J 7/00712 |
| 2020/0274357 | A1* | 8/2020 | Inoue | H02J 7/00712 |
| 2021/0036514 | A1* | 2/2021 | Uto | H02J 1/04 |
| 2021/0066912 | A1* | 3/2021 | Mitsunaga | H01M 10/46 |
| 2021/0066929 | A1* | 3/2021 | Suzuki | H02J 7/34 |

* cited by examiner

*Primary Examiner* — Daniel Kessie
*Assistant Examiner* — Brian K Baxter
(74) *Attorney, Agent, or Firm* — Qinghong Xu

(57) ABSTRACT

A method for controlling a DC bus voltage in a DC bus system, the system including a DC bus and an energy storage unit coupled to the DC bus, includes: detecting a DC bus voltage; detecting, by the energy storage unit, a DC bus voltage of the DC bus; determining, by the energy storage unit, a power reference value based on the DC bus voltage; and adjusting, by the energy storage unit, one of output power and absorbing power based on the power reference value.

22 Claims, 13 Drawing Sheets

METHOD AND SYSTEM FOR CONTROLLING DC BUS VOLTAGE

CROSS REFERENCE

This application is based upon and claims priority to Chinese Patent Application No. 201810570503.0, filed on Jun. 5, 2018, the entire contents thereof are incorporated herein by reference.

TECHNICAL FIELD

The present disclosure relates to the field of power supply technologies, and more particularly, to a method and a system for controlling a direct current (DC) bus voltage.

BACKGROUND

A DC distribution grid has been widely used in, for example, a subway traction system because of its low line loss, high reliability, needless phase frequency control, strong ability in accepting distributed power sources and other advantages.

The subway traction system typically includes a rectifying power supply, a traction converter (VVVF), an energy feedback grid-tied inverter system (ERS), a braking energy dissipation resistor system (EDS), and/or a braking energy storage system (ESS). As shown in FIG. 1, the ESS system generally controls bidirectional power conversion by a bidirectional DC converter. The ERS system is used to feed excessive energy of a DC bus back to the grid. The power of the VVVF is determined by train running demands and states. To ensure that a DC bus voltage of a traction DC distribution grid is stabilized within a normal operating voltage range, it is required to adjust, in time, power of the ERS, ESS or the EDS based on the train running states and grid voltage conditions. In related technologies, a bidirectional power converter of the ESS is adjusted generally by instructions output by a system controller (CSU) of the DC distribution grid to control the power of the ESS. However, when the communication is abnormal or a communication speed cannot satisfy dynamic power regulation requirements of the system, it is impossible to guarantee timely regulation of the DC bus voltage in most cases.

In addition, the DC distribution grid is also used in distributed new energy power generation and energy storage systems. When the communication between each energy storage unit (such as ESS and ERS) and the system controller is abnormal or the communication speed cannot satisfy requirements for power dynamic change, the bus voltage instability for the system operation becomes a problem urgent to be solved.

Therefore, it is required a method for controlling a DC bus voltage more quickly and more timely.

It is to be noted that the above information disclosed in this Background section is only for enhancement of understanding of the background of the present disclosure and therefore it may contain information that does not form the prior art that is already known to a person of ordinary skill in the art.

SUMMARY

The present disclosure is directed to provide a method and a system for controlling a direct current (DC) bus voltage, so as to overcome, at least to a certain extent, one or more problems caused by limitations and defects of related technologies.

According to a first aspect of embodiment of the present disclosure, there is provided a method for controlling a DC bus voltage in a DC bus system, the system including a DC bus and an energy storage unit coupled to the DC bus. The method includes:

detecting, by the energy storage unit, a DC bus voltage;

determining, by the energy storage unit, a power reference value based on the DC bus voltage; and adjusting, by the energy storage unit, one of output power and absorbing power based on the power reference value.

According to another aspect of the present disclosure, there is provided a system for controlling DC bus voltage, which includes:

a voltage master controller, coupled to a DC bus and configured to adjust a DC bus voltage based on a running state of the system;

a plurality of energy storage units coupled to the DC bus, wherein each of the energy storage units comprises a power controller and a power unit, the power controller is configured to adjust an output power or an absorbing power of the power unit based on the DC bus voltage;

wherein the power controller comprises:

a detector, configured to detect the DC bus voltage;

a calculator, configured to determine a power reference value based on the DC bus voltage; and a controller, configured to control an operating state of the power unit to adjust, in real time, the output power or the absorbing power of the power unit based on the power reference value.

According to the method for controlling a DC bus voltage provided by the present disclosure, an energy storage unit coupled to the DC bus automatically adjusts its operating power based on the DC bus voltage, which may avoid a problem, in the related technologies, that is limited by a communication state and coordination ability of a master controller when regulating the DC bus voltage, enhance efficiency of regulating the DC bus voltage and effectively guarantee stability of the DC bus voltage.

It should be understood that the above general description and the detailed description below are merely exemplary and explanatory, and do not limit the present disclosure.

BRIEF DESCRIPTION OF THE DRAWINGS

The accompanying drawings herein are incorporated in and constitute a part of this specification, illustrate embodiments conforming to the present disclosure and together with the description serve to explain the principles of the present disclosure. Apparently, the accompanying drawings in the following description show merely some embodiments of the present disclosure, and persons of ordinary skill in the art may still derive other drawings from these accompanying drawings without creative efforts.

DETAILED DESCRIPTION

Figure 1:
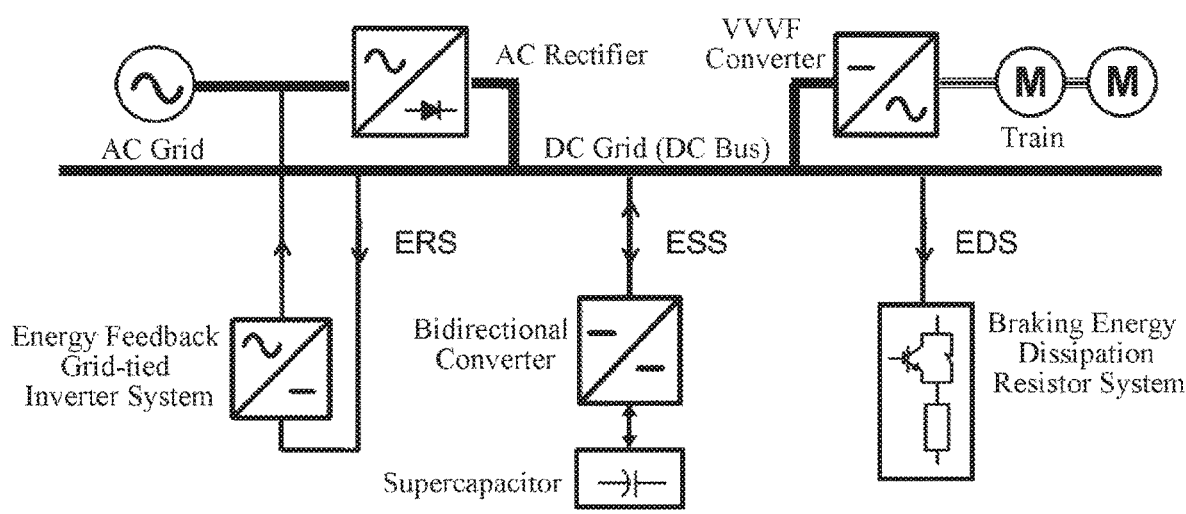
FIG. 1 is an architecture diagram of a DC bus in related technologies.

Exemplary embodiments will be described more comprehensively by referring to accompanying drawings now. However, the exemplary embodiments can be embodied in many forms and should not be construed as limited to the embodiments set forth herein; rather, these embodiments are provided so that this disclosure will be made thorough and complete, and the concept of exemplary embodiments will be fully conveyed to those skilled in the art. Furthermore, the described features, structures, or characteristics may be combined in any suitable manner in one or more embodiments. In the following description, numerous specific details are provided to provide a thorough understanding of the embodiments of the present disclosure. Those skilled in the art will recognize, however, that the technical solution of the present disclosure may be practiced without one or more of the specific details described, or that other methods, components, materials, etc. may be employed. In other instances, well-known technical solutions are not shown or described in detail to avoid obscuring aspects of the present disclosure.

Furthermore, the accompanying drawings are merely schematic illustrations of the present disclosure. Same or similar parts are denoted by same reference numbers in the drawings and, thus, a detailed description thereof will be omitted. Some block diagrams shown in the figures are functional entities and not necessarily to be corresponding to a physically or logically individual entities. These functional entities may be implemented in software form, or implemented in one or more hardware modules or integrated circuits, or implemented in different networks and/or processor apparatuses and/or microcontroller apparatuses.

A detailed description of the exemplary embodiments of the present disclosure will be made in the following with reference to the accompanying drawings.

Figure 2:
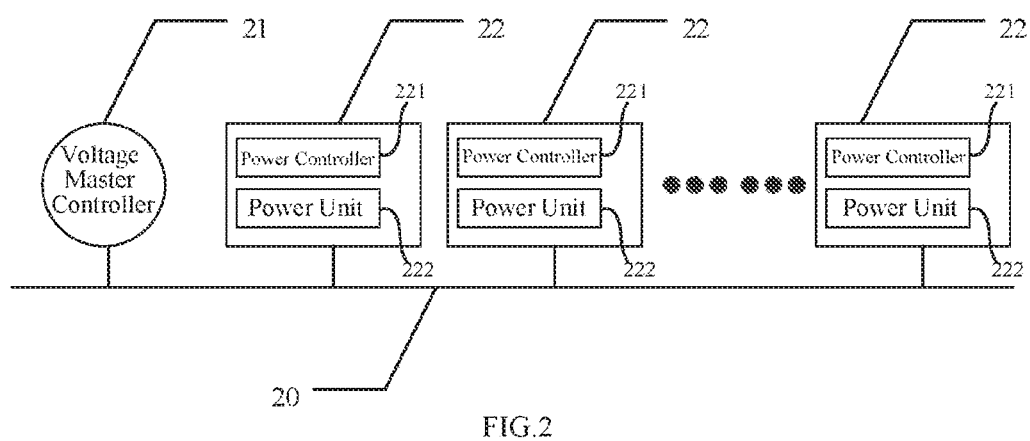
FIG. 2 is a block diagram of a system for controlling a DC bus voltage according to an exemplary embodiment of the present disclosure.

FIG. 2 is a block diagram of a system for controlling a DC bus voltage according to an embodiment of the present disclosure.

Referring to FIG. 2, the system 200 for controlling a DC bus voltage may include:

a voltage master controller 21, coupled to a DC bus 20 and configured to adjust a DC bus voltage based on a running state of the system:

a plurality of energy storage units 22 coupled to the DC bus, wherein each of the energy storage units includes a power controller 221 and a power unit 222, the power controller 221 is configured to adjust an output power or an absorbing power of the power unit 222 based on voltage of the DC bus 20.

The voltage master controller 21 may be, for example, one rectifying power supply or a group of rectifying power supplies, one bidirectional gird-connected inverter or a group of bidirectional gird-connected inverters, one primary energy storage controller or a group of primary energy storage controllers, etc.

The energy storage unit 22 may be configured to output power output to the DC bus or absorb power from the DC bus, for example, the ESS and the ERS as mentioned previously. Taking a subway traction system as an example, the braking energy storage system (ESS) may be controlled and adjusted, by a bidirectional DC converter, to be a power output mode and a power absorbing mode; and the energy feedback grid-tied inverter system (ERS) may work in the power absorbing mode, and a power supply may work in the power output mode. In addition, the energy storage unit may also include a DC load or an AC load for absorbing power from the DC bus. In an exemplary embodiment of the present disclosure, each energy storage unit may be provided with a power controller to adjust an operating mode and an operating parameter for the power unit based on the DC bus voltage.

Figure 3:
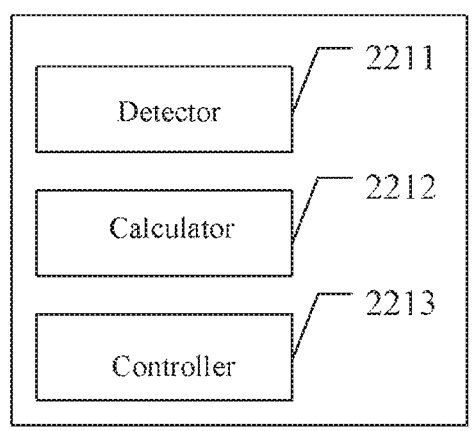
FIG. 3 is a schematic functional diagram of a power controller according to an exemplary embodiment of the present disclosure.

FIG. 3 is a schematic functional diagram of a power controller according to an exemplary embodiment of the present disclosure.

Referring to FIG. 3, the power controller 221 may include:

a detector 2211, configured to detect the DC bus voltage;

a calculator 2212, configured to determine a power reference value based on the DC bus voltage; and a controller 2213, configured to control an operating state of the power unit 222 to adjust, in real time, the output power or the absorbing power of the corresponding power unit based on the power reference value.

Figure 4:
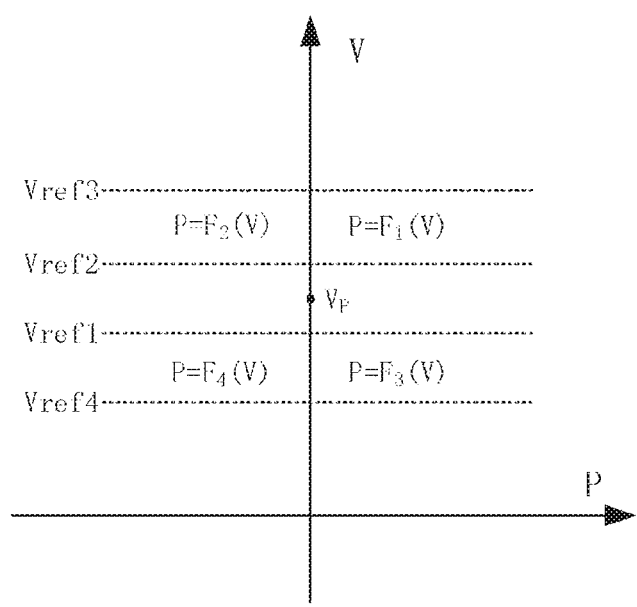
FIG. 4 is a schematic diagram of determining a power reference value by a calculator according to an exemplary embodiment of the present disclosure.

FIG. 4 is a schematic diagram of determining a power reference value by a calculator according to an exemplary embodiment of the present disclosure. Referring to FIG. 4, when the energy storage unit is configured to output power to the DC bus (i.e., the output power is a positive value), the calculator may determine the output power reference value based on the DC bus voltage in response to real-time variation of the DC bus voltage.

For example, the power reference value is determined based on a first preset operating mode when the DC bus voltage is greater than a first preset value Vref1 and less than or equal to a second preset value Vref2.

The power reference value is determined based on a first function $P=F_1(V)$ when the DC bus voltage is greater than the second preset value Vref2 and less than or equal to a third preset value Vref3.

The power reference value is determined based on a third function $P=F_3(V)$ when the DC bus voltage is greater than a fourth preset value Vref4 and less than or equal to the first preset value Vref1:

wherein V represents the DC bus voltage, and P represents the output power reference value of the energy storage unit.

The first preset operating mode may refer to a mode where the output power is in a common interval. That is, each power converter determines a power output value based on its own energy management demand. The first preset operating mode may be an equipower output operating mode, or may be an operating mode of an output power determined based on a function, which is not limited in the present disclosure. It may be understood that when the DC bus voltage is greater than the first preset value Vref1 and less than or equal to the second preset value Vref2, excluding the voltage master controller 21, each energy storage unit does not respond to or control variation of the DC bus voltage.

A voltage range between the first preset value and the second preset value is nearby the rated operational voltage of the DC bus, and may be referred to as a "central section". In an exemplary embodiment of the present disclosure, a relationship between the first preset value Vref1 and the second preset value Vref2 may, for example, satisfy the following formulas:

$$V\text{ref1}=(1+K1)*Vp \qquad (1)$$

$$V\text{ref2}=(1+K2)*Vp \qquad (2)$$

wherein Vp represents a rated operational voltage of the DC bus, K1 and K2 represent any one value ranging from −30% to 30%, and K2 is greater than K1. In general, the Vref2 is greater than the Vref1. In some other embodiments, K1 and K2 also may be other values, which may be set by those skilled in the art according to actual situation.

A voltage range between the second preset value and the third preset value and a voltage range between the fourth preset value and the first preset value may be referred to as "operating regulation section". In an exemplary embodiment of the present disclosure, a relationship between the third preset value Vref3 and the fourth preset value Vref4 may satisfy, for example, following formulas:

$$V\text{ref3}=(1+K3)*V\text{ref2} \qquad (3)$$

$$V\text{ref4}=(1-K4)*V\text{ref1} \qquad (4)$$

wherein K3 and K4 represent any value ranging from 0 to 30%.

That is, in the embodiments of the present disclosure, Vref3 is greater than Vref2, and Vref4 is smaller than Vref1. Similar to K1 and K2, values of K3 and K4 also may be set by those skilled in the art according to the actual situation.

In the voltage range between Vref3 and Vref2, the DC bus voltage exceeds the rated operational voltage, and its excess magnitude is determined by the values of Vref3 and Vref2. In this interval, the power reference value may be determined based on the first function $P=F1(V)$, wherein the first function may be a monotone decreasing function, such that the controller 2213 may control the output power of the power unit 222 to be inversely proportional to the power of the DC bus voltage when the DC bus voltage is higher. That is, the output power of the power unit 222 is reduced when the DC bus voltage rises. In one embodiment, when the DC bus voltage is greater than the third preset value Vref3, the power reference value may be determined as a minimum preset output power, such that the power unit 222 operates at the minimum preset output power, thereby ensuring stable power supply of a DC grid as much as possible when the DC bus voltage exceeds the third preset value.

In the voltage range between Vref1 and Vref4, the DC bus voltage is lower than the rated operational voltage, and its shortage magnitude is determined by the values of Vref1 and Vref4. In this interval, the power reference value may be determined based on the third function $P=F_3(V)$, wherein the third function may be a monotone decreasing function, such that the controller 2213 may control the output power of the power unit 222 to be inversely proportional to the voltage of the DC bus voltage when the DC bus voltage is lower. That is, the output power of the power unit 222 is increased when the DC bus voltage drops. In one embodiment, when the DC bus voltage is smaller than or equal to the fourth preset value Vref4, the power reference value may be determined as a rated output power, thereby ensuring stable power supply of a DC grid when the DC bus voltage is lower than the fourth preset value.

In an exemplary embodiment of the present disclosure, the DC bus voltage control system further includes a new energy generating apparatus coupled to the DC bus, and in this case, the calculator is further configured to:

limit the power reference value of the new energy generating apparatus to an output power limit when the DC bus voltage is greater than the third preset value, wherein the output power limit is preset based on the fifth function corresponding to the DC bus voltage. That is, when the DC bus voltage is less than or equal to the third preset value, the new energy generating apparatus may be controlled to operate at a maximum tracking power to supply power to the DC grid. However, when the DC bus voltage is greater than the third preset value, the DC grid is prone to excessive power. Therefore, a power limit may be set for the new energy generating apparatus based on the fifth function and the DC bus voltage, such that its output power is not greater than the power limit. In this way, the risk of excessive power of the DC grid is reduced, thereby ensuring stable power supply of the DC grid.

Still referring to FIG. 4, in an exemplary embodiment of the present disclosure, when the energy storage unit 22 is configured to absorb power from the DC bus (i.e., the output power is a negative value), the calculator 222 may determine the absorbing power reference value based on the DC bus voltage in response to real-time variation of the DC bus voltage.

For example, the power reference value is determined based on a second preset operating mode when the DC bus voltage is greater than the first preset value Vref1 and less than or equal to the second preset value Vref2.

The power reference value is determined based on the second function $P=F_2(V)$ when the DC bus voltage is greater than the second preset value Vref2 and less than or equal to the third preset value Vref3.

The power reference value is determined based on a fourth function $P=F_4(V)$ when the DC bus voltage is greater than the fourth preset value Vref4 and less than or equal to the first preset value Vref1;

wherein V represents the DC bus voltage, and P represents the absorbing power reference value of the energy storage unit.

Similar to the output power, when the DC bus voltage is near the rated operational voltage, each power unit may be controlled to determine a power absorption value based on their energy management demands. When the DC bus voltage is greater than, within a certain range, the rated operational voltage, and exceeds the second preset value but does not exceed the third preset value, the absorbing power reference value may be determined based on the second function. In this embodiment, a negative number is employed to represent the power absorbed from the DC bus, and a positive number is employed to represent the power outputted to the DC bus. In an exemplary embodiment of the present disclosure, the second function is a monotone decreasing function. That is, when the DC bus voltage is greater than, within a certain range, the rated operational voltage, but does not exceed the third preset value Vref3, the power value (its absolute value is taken if the power value is negative) absorbed by the energy storage unit 22 is controlled to be associated with the DC bus voltage, such that the power absorbed by the power unit 222 is increased when the DC bus voltage rises. In an exemplary embodiment of the present disclosure, when the DC bus voltage is greater than the third preset value Vref3, the power reference value also may be determined as the maximum preset absorbing power, such that the power unit 222 absorbs power from the DC bus at the maximum preset absorbing power. In this way, power supply of a DC grid is ensured to be stable when the DC bus voltage exceeds the third preset value.

When the DC bus voltage is less than, within a certain range, the rated operational voltage, and is lower than the first preset value but is not less than the fourth preset value, the absorbing power reference value may be determined based on the fourth function. In an exemplary embodiment of the present disclosure, a negative number is employed to represent the power absorbed from the DC bus, and thus the fourth function is a monotone decreasing function. That is, when the DC bus voltage is smaller than, within a certain range, the rated operational voltage, but is smaller than the fourth preset value Vref4, the power value absorbed by the energy storage unit 22 is controlled to be associated with the DC bus voltage, such that the power absorbed by the power unit 222 is decreased when the DC bus voltage drops. In an exemplary embodiment of the present disclosure, when the DC bus voltage is smaller than the fourth preset value Vref4, the power reference value also may be determined as zero, such that the power unit 222 stops absorbing power from the DC bus, thereby ensuring stable power supply of a DC grid when the DC bus voltage is lower than the fourth preset value.

In an exemplary embodiment of the present disclosure, the DC bus voltage control system further includes DC loads and/or AC loads, a part of which may be controlled to be partially unloaded based on the bus voltage when the DC bus voltage is less than or equal to the fourth preset value, such that power balance is achieved, or all the DC loads and/or AC loads are unloaded to go into a protection mode. That is, when the DC bus voltage is less than or equal to the fourth preset value, the DC loads and/or the AC loads may be controlled to be unloaded by themselves.

In this embodiment, the first preset value, the second preset value, the third preset value, and the fourth preset value are described in one figure. However, in actual operation, when the energy storage unit is configured to absorb power from the DC bus or output power to the DC bus, the reference preset values may be different. The reference preset values of the new energy generating apparatus, the DC loads and the AC loads may be different from those of the energy storage units. In some embodiments, because each energy storage unit has its own controller and calculator, the first preset value, the second preset value, the third preset value and the fourth preset value different from those of other energy storage units may be set for each energy storage unit to flexibly adjust the working power based on its own working conditions and energy management demands so as to maintain stable power supply of a DC grid.

In addition, the first preset value, the second preset value, the third preset value and the fourth preset value above are merely exemplary descriptions. In practical applications, a tolerance may be set for each preset value, and when the DC bus voltage is within the tolerance range of an xth preset value, a power determination rule that the calculator should refer to is determined according to the actual situation.

By enabling each energy storage unit, the new energy generating apparatus and the loads adjust operating power thereof based on the DC bus voltage, the power of the DC grid may be flexibly adjusted. In this way, adverse effects of communication conditions on adjustment of the DC bus voltage can be reduced, thereby ensuring the reliability of power supply for the DC gird.

It is to be noticed that although a plurality of modules or units of the device for action execution have been mentioned in the above detailed description, this partition is not compulsory. Actually, according to the embodiment of the present disclosure, features and functions of two or more modules or units as described above may be embodied in one module or unit. Reversely, features and functions of one module or unit as described above may be further embodied in more modules or units.

Figure 5A:
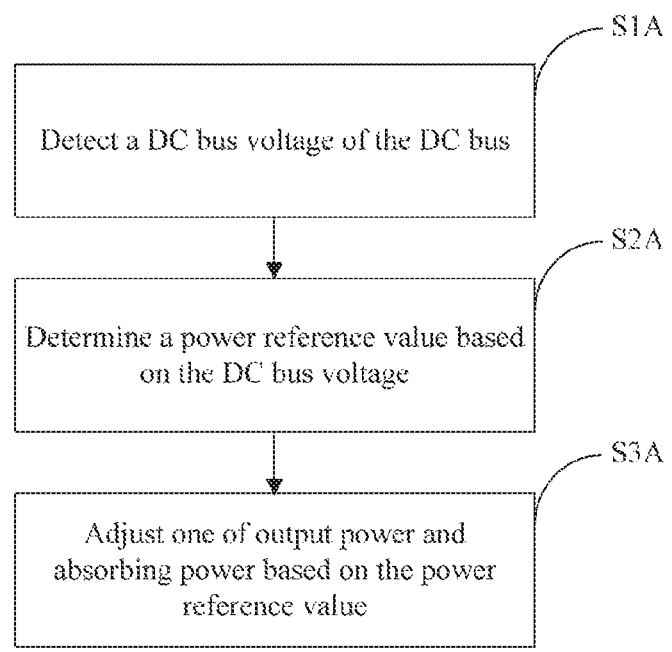
FIG. 5A is a flowchart of a method for controlling a DC bus voltage according to an embodiment of the present disclosure.

FIG. 5A is a flowchart of a method for controlling a DC bus voltage according to an embodiment of the present disclosure. The method for controlling a DC bus voltage may be applied to the system for controlling a DC bus voltage as shown in FIG. 2.

Referring to FIG. 5A, the method 500A for controlling a DC bus voltage may include:

Step S1A: detecting a DC bus voltage;

Step S2A: determining, by the energy storage unit, a power reference value based on the DC bus voltage;

Step S3A adjusting, by the energy storage unit, one of output power and absorbing power based on the power reference value.

Figure 5B:
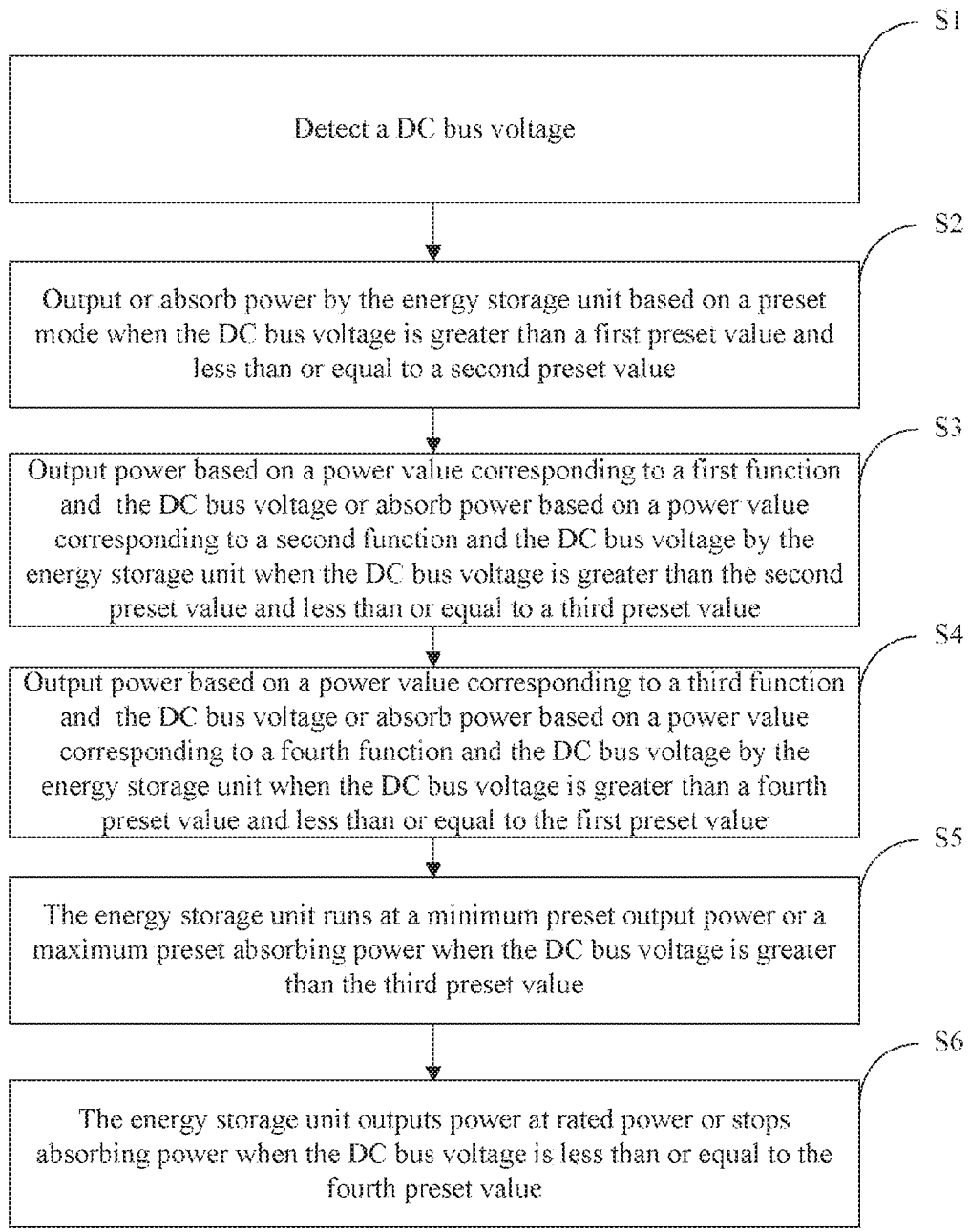
FIG. 5B is a flowchart of a method for controlling a DC bus voltage according to another embodiment of the present disclosure.

FIG. 5B is a flowchart of a method for controlling a DC bus voltage according to another embodiment of the present disclosure. The method for controlling a DC bus voltage may be applied to the system for controlling a DC bus voltage as shown in FIG. 2.

Referring to FIG. 5B, the method 500 for controlling a DC bus voltage may include:

Step S1: detecting a DC bus voltage;

Step S2: outputting or absorbing power by the energy storage unit based on a preset mode when the DC bus voltage is greater than a first preset value and less than or equal to a second preset value;

Step S3: outputting power based on a power value corresponding to a first function and the DC bus voltage or absorbing power based on a power value corresponding to a second function and the DC bus voltage by the energy storage unit when the DC bus voltage is greater than the second preset value and less than or equal to a third preset value; and Step S4: outputting power based on a power value corresponding to a third function and the DC bus voltage or absorbing power based on a power value corresponding to a fourth function and the DC bus voltage by the energy storage unit when the DC bus voltage is greater than a fourth preset value and less than or equal to the first preset value.

In an exemplary embodiment of the present disclosure, the method 500 may further include:

Step S5: the energy storage unit running at a minimum preset output power or a maximum preset absorbing power when the DC bus voltage is greater than the third preset value, and Step S6: the energy storage unit outputting power at rated power or stopping absorbing power when the DC bus voltage is less than or equal to the fourth preset value.

In an exemplary embodiment of the present disclosure, the DC bus system further includes a new energy generating unit coupled to the DC bus.

An output power limit of the new energy generating unit is set based on a power value in a fifth function corresponding to the DC bus voltage when the DC bus voltage is greater than the third preset value to control an output power of the new energy generating apparatus not more than the output power limit.

In an exemplary embodiment of the present disclosure, the DC bus system further includes a DC load or an alternating current (AC) load coupled to the DC bus.

The DC load or the AC load is unloaded when the DC bus voltage is less than or equal to the fourth preset value.

In an exemplary embodiment of the present disclosure, independent variables of the first function and the third function are the DC bus voltage, dependent variables of the first function and the third function are an output power reference value of the energy storage unit, and the energy storage unit controls, based on the output power reference value, power outputted from the energy storage unit to the DC bus.

In an exemplary embodiment of the present disclosure, independent variables of the second function and the fourth function are the DC bus voltage, dependent variables of the second function and the fourth function are an absorbing power reference value of the energy storage unit, and the energy storage unit controls, based on the absorbing power reference value, power absorbed from the DC bus by the energy storage unit.

In an exemplary embodiment of the present disclosure, an independent variable of the fifth function is the DC bus voltage, and a dependent variable of the fifth function is the output power limit of the new energy generating unit. The new energy generating unit controller controls that, based on the output power limit, the power outputted to the DC bus by the new energy generating apparatus is below the output power limit.

In an exemplary embodiment of the present disclosure, a positive number is adopted to represent a power outputted to the DC bus, and a negative number is adopted to represent a power absorbed from the DC bus. The first function, the second function, the third function, the fourth function and the fifth function are monotone decreasing functions.

In the embodiment as shown in FIG. 5B, functions represented by the second function and the third function are different from the embodiment as shown in FIG. 4, which are set for ease of description but have no tangible impact on implementation manners of the embodiments of the present disclosure.

The embodiments of the present disclosure are described below with reference to application scenes.

Figure 6:
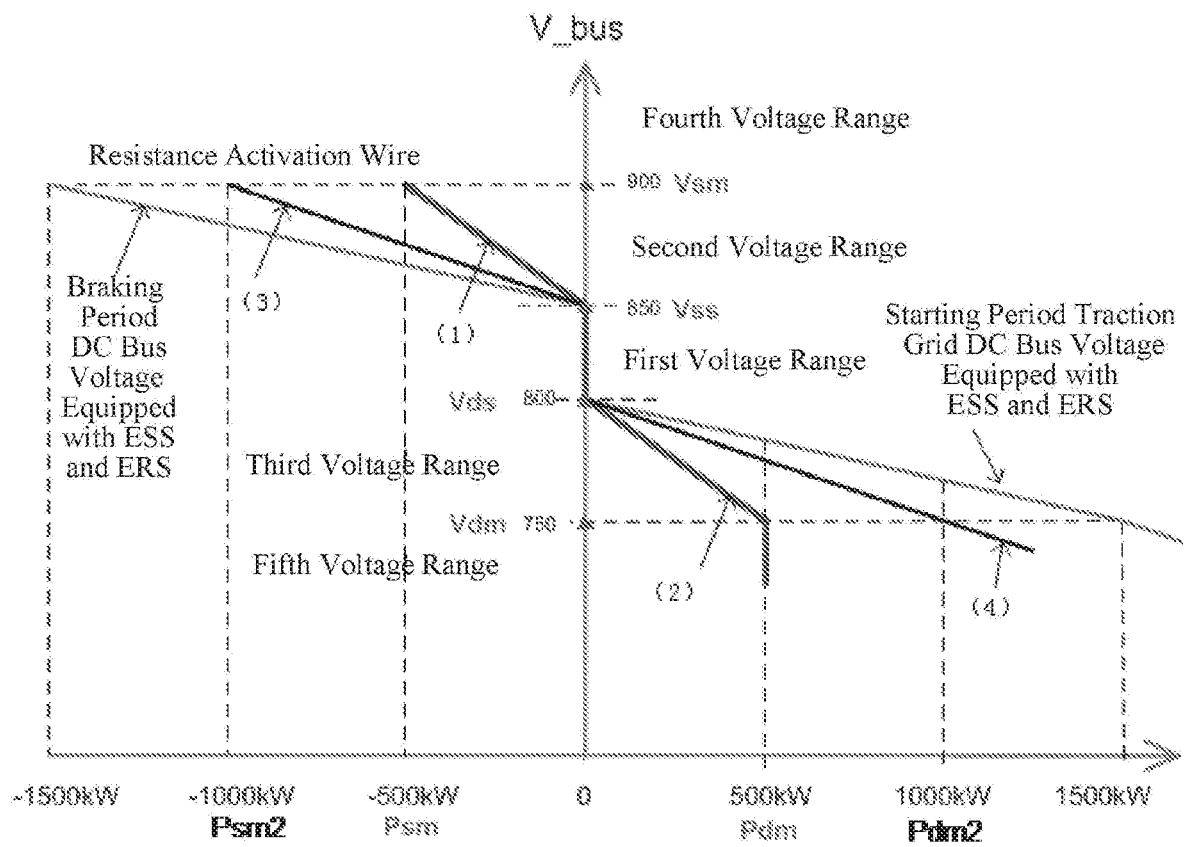
FIG. 6 is a schematic operating diagram when the embodiments of the present disclosure are applied to a braking energy absorption system of a subway substation.

FIG. 6 is a schematic operating diagram when the embodiments of the present disclosure are applied to a braking energy absorption system of a subway substation. Referring to FIG. 6, supposing that a subway traction power supply system having a rated voltage of 750V is equipped with a 1 MW feed inverter (ERS) and a 500 kW energy storage system (ESS), the subway traction power supply system continuously run without communication and system control commands.

The first preset value is set to 800V, the second preset value is set to 850V, the third preset value is set to 900V. and the fourth preset value is set to 750V. The range between the first preset value and the second preset value is defined as a first voltage range, the range between the second preset value and the third preset value is defined as a second voltage range, and a range between the first preset value and the fourth preset value is defined as a third voltage range.

It is assumed that the operating powers of the energy storage system (ESS) in the second voltage range and the third voltage range are determined by functions represented by line segments (1) and (2) in FIG. 6 respectively:

$$P1(V) = P0 + \frac{Psm - P0}{Vsm - Vss} * (V - Vss) \quad (5)$$

$$P2(V) = P0 + \frac{Pdm - P0}{Vdm - Vds} * (V - Vds) \quad (6)$$

wherein, Vds represents the first preset value, Vss represents the second preset value, Vsm represents the third preset value, Vdm represents the fourth preset value, P0 represents a corresponding power value when the bus voltage is the second preset value, Psm represents a corresponding power value when the bus voltage is the third preset value, and Pdm represents a corresponding power value when the bus voltage is the fourth preset value.

It is assumed that the operating powers of the feed inverter (ERS)/rectifying unit in the second voltage range and the third voltage range are determined by functions represented by line segments (3) and (4) in FIG. 6 respectively:

$$P3(V) = P0 + \frac{Psm2 - P0}{Vsm - Vss} * (V - Vss) \quad (7)$$

$$P4(V) = P0 + \frac{Pdm2 - P0}{Vdm - Vds} * (V - Vds) \quad (8)$$

wherein, Psm2 represents a corresponding power value when the bus voltage of the feed inverter is the third preset value, and Pdm2 represents a corresponding power value when the bus voltage of the rectifying unit is the fourth preset value.

The functional relationship of P1-P4 may be preset in the calculator of each energy storage unit (ESS. ERS, and the rectifying unit), such that its own control power of the controller of each energy storage unit may be independently determined by the DC bus voltage, and the operating power of the corresponding energy storage unit is controlled based on the control power.

Specific implementation methods for power control may have various forms. For example, in this embodiment, this may be implemented by current control on the side of the energy storage unit.

Figure 7:
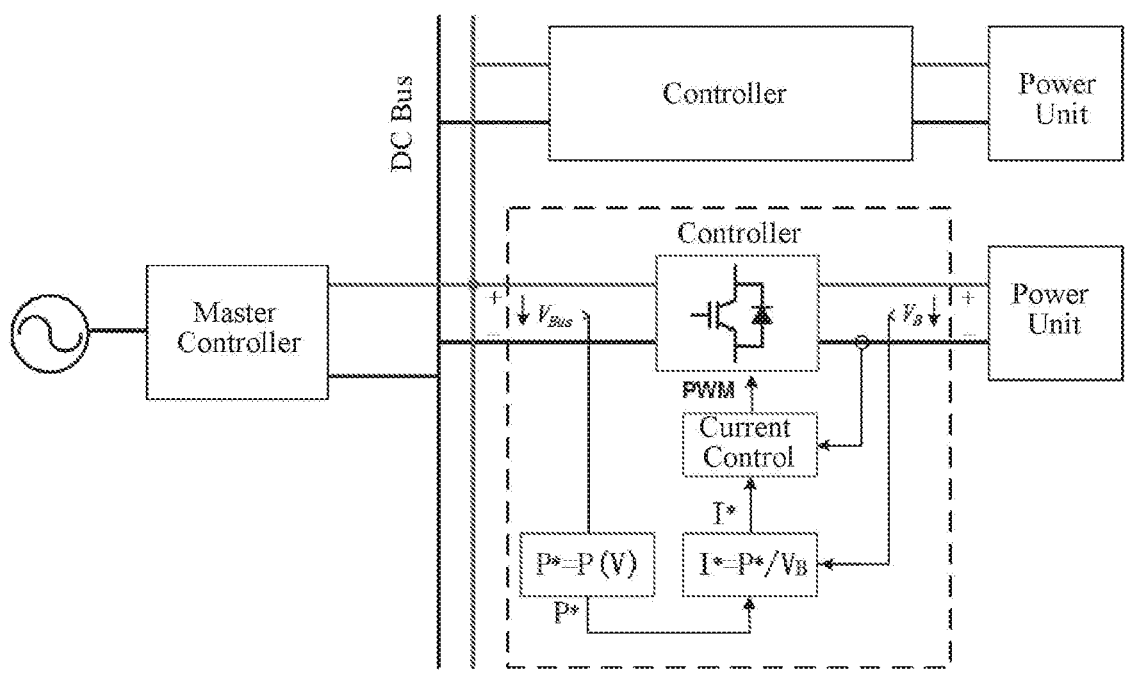
FIG. 7 is a schematic diagram of a power control process according to an embodiment of the present disclosure.

As shown in FIG. 7, a detector of each energy storage unit detects the DC bus voltage. The calculator obtains the control power P* based on the DC bus voltage Vbus and the above preset functional relationship P(V), and then the operating current I* of the energy storage unit is determined based on the control power P* and the operating voltage VB. The controller controls the current of the energy storage unit based on a current controller and the operating current I*, such that the power outputted or absorbed by the energy storage unit is consistent with the control power P*. In other applications, the power control of the energy storage unit also may be implemented by means of current control on the DC bus side.

Figure 8A:
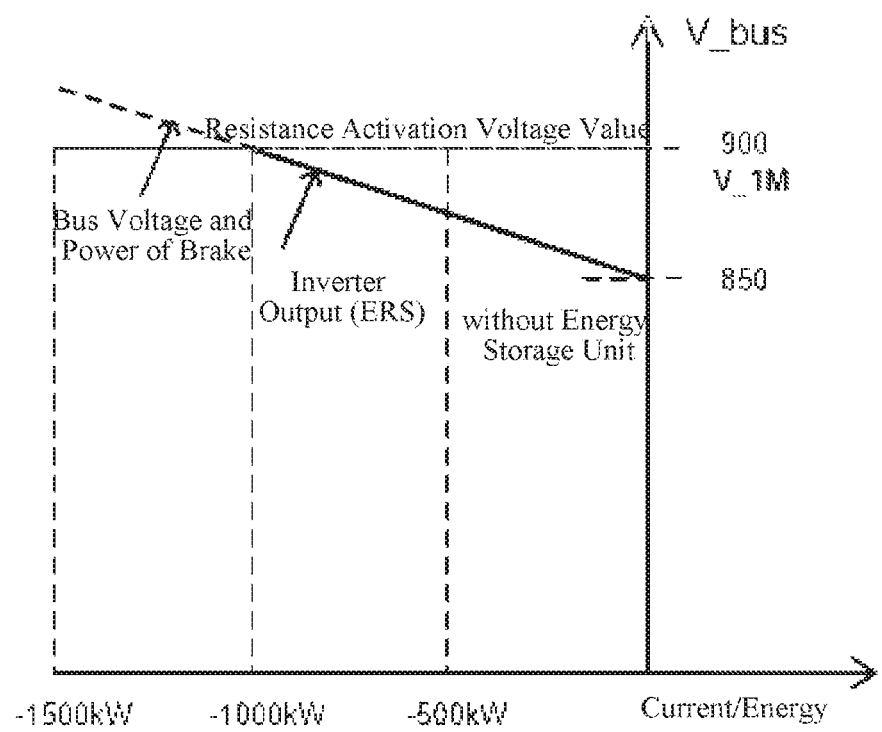
FIG. 8A-FIG. 8C are schematic diagrams of functions in an exemplary running process of the system as shown in FIG. 6.
Figure 8B:
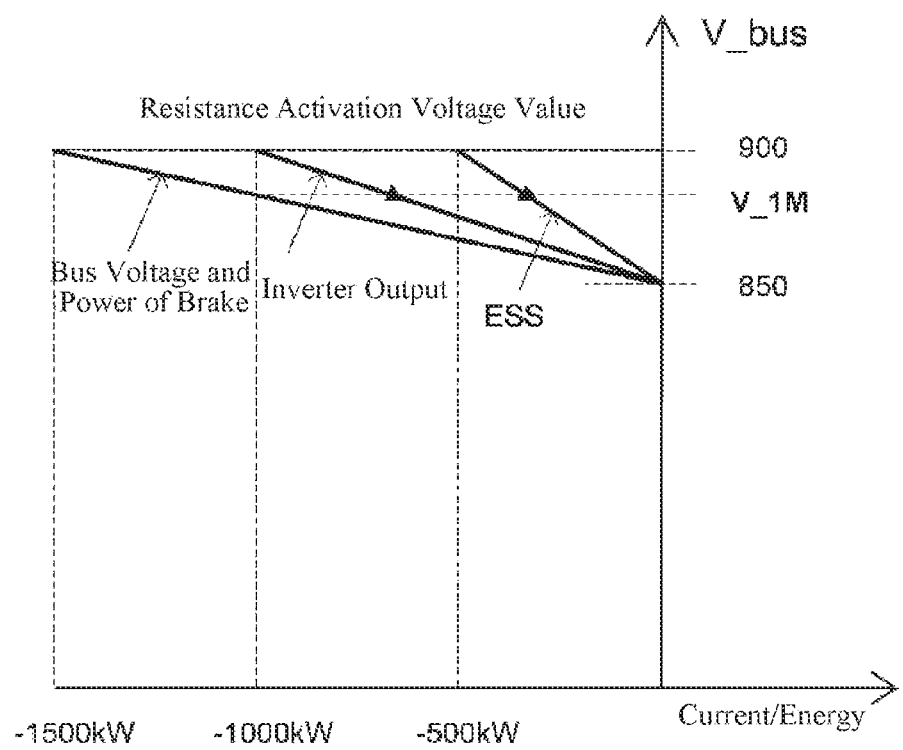
Figure 8C:
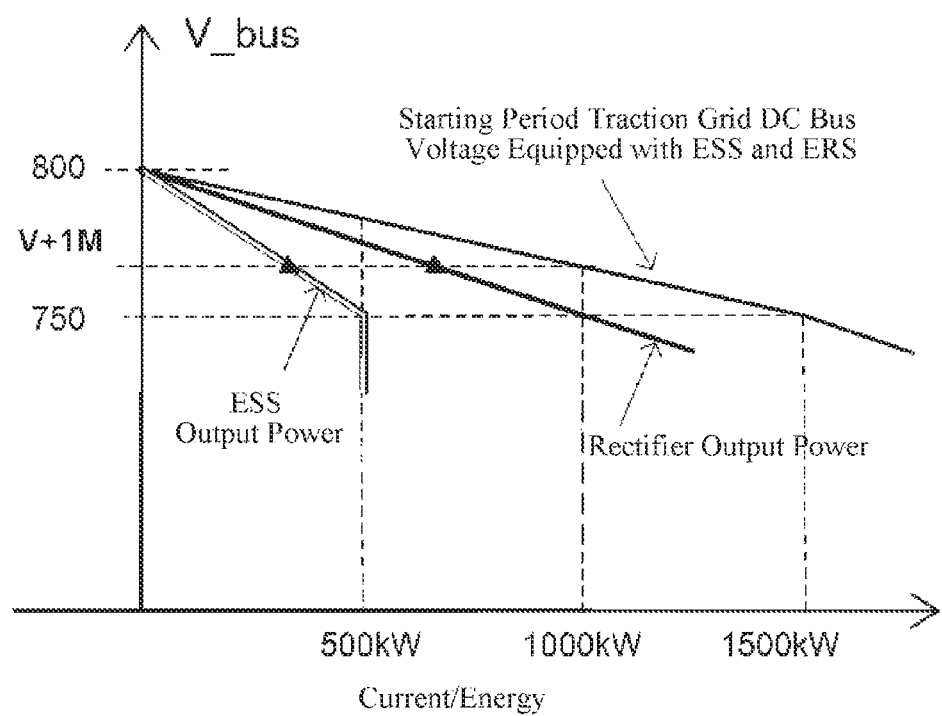

Referring to FIG. 8A-FIG. 8C, the exemplary running process of the system as shown in FIG. 6 is as below.

As shown in FIG. 8A, when it is detected that the DC bus voltage is within the first voltage range (800V to 850V), the controller of the energy storage converter controls the power unit to stop outputting power, i.e., not responding to voltage fluctuation.

When it is detected that the DC bus voltage is within the second voltage range (850V to 900V), it is assumed that the initial system does not have the energy storage converter (ESS), only the inverter and a resistive load absorb the braking energy, and the power control of the inverter allowed for control operation based on a preset functional relationship. When 1000 KW net braking energy is injected into the DC grid, the DC bus voltage rises to 900V until the feed inverter operates at −1000 KW under full load to cancel the net injection of the braking energy. When 1500 KW braking energy is injected into the grid, the DC bus voltage is as high as 900V. At this moment, a load resistor must be started to absorb excessive braking energy.

As shown in FIG. 8B, if a set of 500 kW ESS is equipped in the system, the operating power of the ESS is controlled based on the preset functional relationship. In this way, plug and play may be implemented without changing other settings of the system. When 1000 KW net braking energy is injected into the DC grid, the ESS controller and the inverter determine the absorbing power based on the DC bus voltage, such that the DC bus voltage stabilizes at V_IM, lower than 900V. When 1500 KW braking energy is injected into the grid, the DC bus voltage reaches 900V, but it is still not required to start the load resistor to absorb the braking energy. In this way, by performing power control on the ESS based on the method according to the present disclosure, rise of the DC bus voltage caused by subway braking is effectively restrained.

As shown in FIG. 8C, when it is detected that the DC bus voltage is within the third voltage range (800V to 750V), the calculator of the ESS may determine, based on the DC bus voltage, that the output power is from 0 to 500 kW. The controller controls the power unit of the ESS to compensate the power for the rectifier. In this way, drop of the DC bus voltage caused by acceleration of a train may be reduced. When the traction load is 1000 kW, the ESS discharge power adopting the method according to this embodiment is 350 kW, the rectification output power is 650 kW, and the bus voltage is close to 770V. In this way, by independently controlling the power operation based on the DC bus voltage, the energy storage unit reduces drop of the voltage of the DC grid in the starting process of a train.

Figure 9:
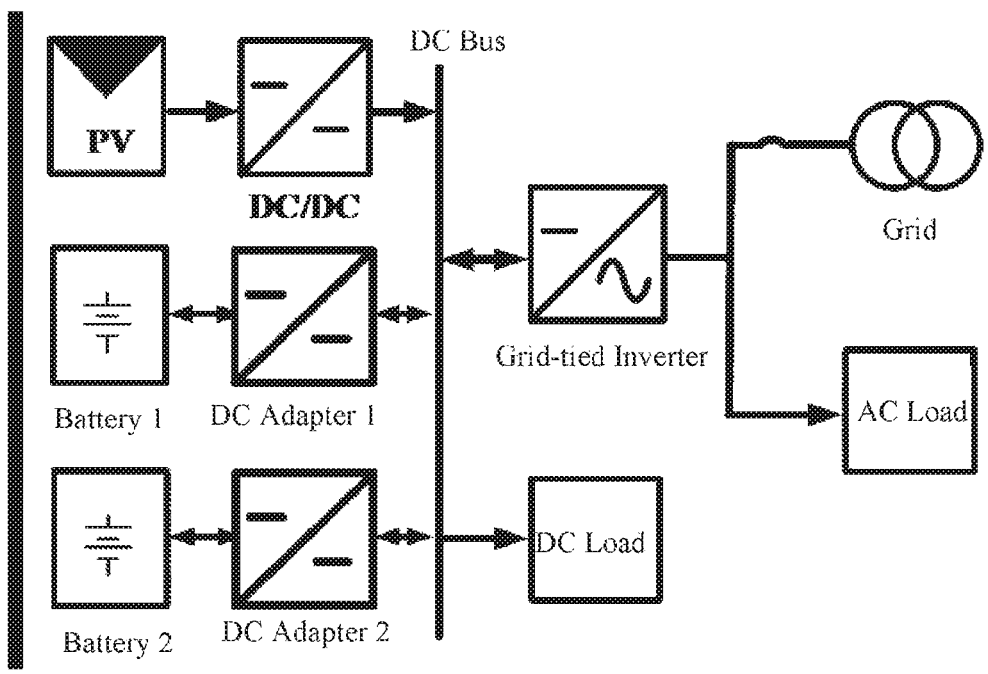
FIG. 9 is a block diagram of a DC bus coupled to a new energy generating apparatus and an energy storage unit according to an embodiment of the present disclosure.

FIG. 9 is a schematic diagram according to still another embodiment of the present disclosure, i.e., a block diagram of a DC grid having a DC bus new energy generating apparatus and an energy storage unit.

Referring to FIG. 9, it is assumed that the new energy generating apparatus coupled to the DC bus and a plurality of energy storage units are connected to run. It is assumed that a DC bus photovoltaic power generation battery energy storage AC grid-tied power generation system has a rated DC bus voltage of 800V, and the system is equipped with a 100 kW grid-tied inverter, a 100 kW energy storage system (Battery1/ESS1), and a 50 kW energy storage system (Battery2/ESS2), a 100 kW new energy generating apparatus and a DC load, wherein the new energy generating apparatus includes a photovoltaic panel PV and a DC/DC converter thereof.

In a grid-tied mode, an operation mode of a preset grid-tied inverter is to control the DC bus voltage within the first voltage range and a tolerance thereof. At this moment, a preset mode of a DC/DC converter of the new energy generating apparatus is a maximum power point tracking mode (MPPT mode). Power is injected into the DC bus according to illumination conditions, and each energy storage system performs charging and discharging operation or standby according to an energy management strategy of the preset mode. When the grid is abnormal, the grid-tied inverter goes into a stand alone mode according to the preset mode. Under any one of the above operating conditions, the system bus voltage may be automatically controlled based on the method of the present disclosure.

When the grid is normal, the grid-tied inverter controls the bus voltage within the first voltage range, and injection power of the inverter (a direction of injection to the DC bus is positive, and a reverse direction is negative) is between 100 kW and −100 kW. If the DC power other than that of the inverter (for example, the sum of the DC power of the new energy generating apparatus, the battery and the DC load) does not exceed the inverter power range limit, the DC bus voltage can be maintained within the first voltage range. If the DC power other than that of the inverter exceeds the inverter power limit, the DC bus voltage cannot be maintained within the first voltage range, and may likely go into the second voltage range or the third voltage range.

At this moment, if the DC bus voltage goes into the second voltage range, this indicates that the power (negative power) absorbed from the DC bus by the inverter is limited, which is insufficient to balance and counteract the injection power of the new energy generating apparatus and the energy storage unit, thus resulting in rise of the bus voltage. In this embodiment, each energy storage unit may automatically reduce the output power or increase the absorbing power as the DC bus voltage increases based on the control method of the present disclosure, such that the DC bus voltage reaches a new balance. If the absorbing power of the energy storage unit reaches the maximum value, but the power of the DC bus still exceed the absorbing capacity of the grid-tied inverter after the power of the new energy generating apparatus is injected into the DC bus, the DC bus voltage may rise to go into the fourth voltage range (more than the third preset value). At this moment, the new energy generating apparatus may automatically reduce the output power, such that the output power does not exceed the maximum preset value, thereby ensuring that the DC bus voltage reaches a new balance.

If the power inputted from the inverter to the DC bus is still insufficient to compensate the power loss of the DC bus, the DC bus voltage goes into the third voltage range, and each energy storage unit may automatically increase the output power to maintain the balance of the DC bus voltage.

Figure 10:
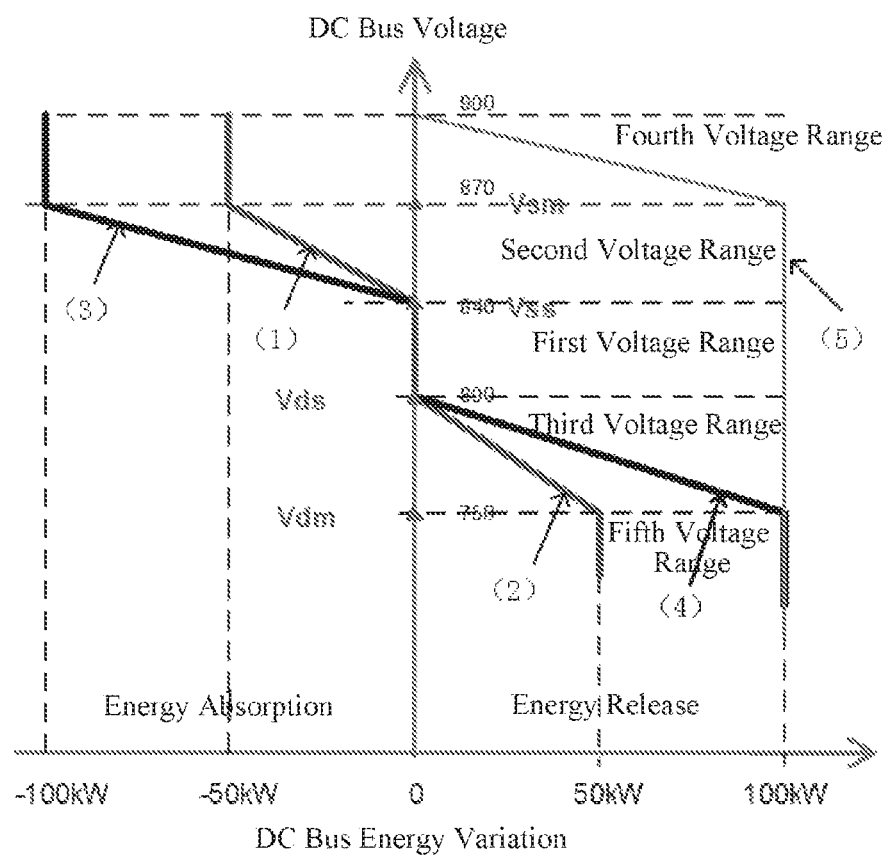
FIG. 10 is a schematic diagram of a function in an exemplary running process according to the embodiment as shown in FIG. 9.

Referring to FIG. 10, it is assumed that the operating power of energy storage units ESS1 and ESS2 may be determined by the function curves as shown in (1), (2) (3) and (4). Within the second voltage range, formulas of the Functions (1) and (3) may be as below:

$$P1(V) = \frac{-100 \text{ kW}}{Vsm - Vss} * (V - Vss) \quad (9)$$

$$P2(V) = \frac{-50 \text{ kW}}{Vsm - Vds} * (V - Vss) \quad (10)$$

The power control of the new energy generating apparatus is determined by the function curve as shown in (5). Within the fourth voltage range, the formula of the Function (5) may be as below:

$$P3(V) = 100 \text{ kW} + \frac{-100 \text{ kW}}{900 - 870} * (V - 870) \quad (11)$$

As can be seen from FIG. 10, when the DC bus voltage rises between Vss (840V) and Vsm (870V), the charge power of the ESS1 (a 100 kW energy storage unit) correspondingly increases from 0 W to 100 kW. When the DC bus voltage drops between 750V and 800V, the discharge power of the ESS1 correspondingly increases from 0 W to 100 kW. The operation rule of the ESS2 (a 50 kW energy storage unit) is similar to that of the ESS1, and thus its detailed description is omitted here. To suppress excessive bus voltage, within the fourth voltage range, the controller of the new energy generating apparatus limits the power output based on a V-P function corresponding to the fifth function, which may be set by the those skilled in the art according to the actual situation.

In addition, if the grid changes from a normal condition to an abnormal condition, the inverter may run independently from the grid and absorb power from the DC bus to supply power to the AC load. If the DC bus power is out of balance, the DC bus voltage may likely go into the second voltage range or the third voltage range.

In the stand alone mode, the DC bus voltage goes into the second voltage range, which indicates that power consumed by the AC load and the DC load is insufficient to counteract the injection power of the new energy generating apparatus and each energy storage unit, thereby causing rise of the bus voltage. In the embodiments of the present disclosure, each energy storage unit may automatically reduce the output power or increase the absorbing power as the voltage increases, such that the DC bus power reaches a new balance. If there is still excessive PV power exceeding the absorbing capacity of the grid-tied inverter when the absorbing power of the energy storage unit reaches the maximum preset value, the bus voltage may rise to go into the fourth voltage range, and the converter of the new energy generating apparatus may automatically reduce the output power, such that the DC bus voltage reaches a new balance.

Conversely, in the stand alone mode, the DC bus voltage goes into the third voltage range, which indicates that the load power of the DC bus exceeds the injection power of the new energy generating apparatus or the energy storage unit, thereby causing drop of the bus voltage. In the embodiments of the present disclosure, at this moment, the new energy generating apparatus may track the output at the maximum power, and each energy storage unit may automatically increase the output power or reduce the absorbing power as the voltage decreases, such that the DC bus power reaches a new balance. If the output power of the energy storage unit reaches its maximum allowable value but is still insufficient to compensate the power absorbed by the load, the DC bus voltage may drop and go into the fifth voltage range. At this moment, each AC load or DC load may be partially unloaded by themselves based on the bus voltage to reach a power balance, or may be completely unloaded by themselves to go into a protection mode.

As shown in the ESS1 and ESS2 power control functions as shown in FIG. 10, if there exist a plurality of energy storage units having different maximum powers in the system, a power control function may be separately set for each energy storage unit or even different voltage ranges may be defined to achieve parallel operation. In addition, strategies in response to DC bus voltage deviation also may be independently set for each energy storage unit, for example, in response to a starting point, a terminal point, a function curve or a look-up table and so on, such that priority and charge and discharge energy management may be respectively set, thereby avoiding complex parameter debugging and procedure processing in centralized control of the system, communication link establishment or multi-loop feedback control and so on, making the energy storage unit easy to implement modular expansion and plug and play.

In the embodiments of the present disclosure, each energy storage unit coupled to the DC bus, the new energy generating apparatus and the load arranged in the system respectively adjust their own operating powers based on the DC bus voltage, such that the DC bus voltage may reach a new balance. In this way, the system voltage remains stable without communication connection or centralized control instructions, thereby avoiding frequently switching system states. Each energy storage unit determines its own operating power by means of calculation or look-up table merely based on the DC bus voltage, which avoids complicated control modes such as double-loop or multi-loop feedback control, simplifies the control process and improves reliability.

As will be appreciated by one skilled in the art, aspects of the present disclosure may be embodied as a system, method or program product. Accordingly, aspects of the present disclosure may take the form of an entirely hardware embodiment, an entirely software embodiment (including firmware, micro-code, etc.) or an embodiment combining software and hardware aspects that may all generally be referred to herein as a "circuit," "module" or "system."

Moreover, the above accompanying drawings are merely illustrative description of processes included in the method according to the exemplary embodiments of the present disclosure and are not intended to limit the present disclosure. It is easy to understand that the processes shown in the above accompanying drawings do not indicate or limit time sequences of these processes. Furthermore, it is also easy to understand that these processes may be executed, for example, synchronously or asynchronously in a plurality of modules.

Other embodiments of the present disclosure will be apparent to those skilled in the art from consideration of the specification and practice of the invention disclosed here. This application is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the claims.

What is claimed is:

1. A method for controlling a DC bus voltage of a DC bus system, the system comprising a DC bus and an energy storage unit coupled to the DC bus, wherein the method comprises:
   detecting, by the energy storage unit, the DC bus voltage of the DC bus system;
   determining, by the energy storage unit, a power reference value based on the DC bus voltage of the DC bus system; and
   adjusting, by the energy storage unit, one of output power and absorbing power based on the power reference value,
   wherein when the energy storage unit is configured to output power to the DC bus system, the determining, by the energy storage unit, the power reference value based on the DC bus voltage of the DC bus system comprises:
   determining the power reference value based on a first preset operating mode when the DC bus voltage of the DC bus system is greater than a first preset value and less than or equal to a second preset value;

determining the power reference value based on a first function when the DC bus voltage of the DC bus system is greater than the second preset value and less than or equal to a third preset value; and determining the power reference value based on a third function when the DC bus voltage of the DC bus system is greater than a fourth preset value and less than or equal to the first preset value;

wherein independent variables of the first function and the third function are the DC bus voltage of the DC bus system, and dependent variables of the first function and the third function are an output power reference value of the energy storage unit; and when the energy storage unit is configured to absorb power from the DC bus of the DC bus system, the determining, by the energy storage unit, the power reference value based on the DC bus voltage of the DC bus system comprises:

determining the power reference value based on a second preset operating mode when the DC bus voltage of the DC bus system is greater than the first preset value and less than or equal to the second preset value;

determining the power reference value based on a second function when the DC bus voltage of the DC bus system is greater than the second preset value and less than or equal to the third preset value; and determining the power reference value based on a fourth function when the DC bus voltage of the DC bus system is greater than the fourth preset value and less than or equal to the first preset value;

wherein independent variables of the second function and the fourth function are the DC bus voltage of the DC bus system, and dependent variables of the second function and the fourth function are an absorbing power reference value of the energy storage unit.

2. The method according to claim 1, wherein when the energy storage unit is configured to output power to the DC bus, the determining, by the energy storage unit, a power reference value based on the DC bus voltage further comprises:

determining the power reference value as a minimum preset output power when the DC bus voltage is greater than the third preset value; and determining the power reference value as a rated output power when the DC bus voltage is less than or equal to the fourth preset value.

3. The method according to claim 1, wherein when the energy storage unit is configured to absorb power from the DC bus, the determining, by the energy storage unit, a power reference value based on the DC bus voltage further comprises:

determining the power reference value as a maximum preset absorbing power when the DC bus voltage is greater than the third preset value; and determining the power reference value as zero when the DC bus voltage is less than or equal to the fourth preset value.

4. The method according to claim 1, wherein the DC bus system further comprises a new energy generating unit coupled to the DC bus, and when the energy storage unit is configured to output power to the DC bus, the method further comprising:

setting an output power limit for the new energy generating unit based on a fifth function when the DC bus voltage is greater than the third preset value, controlling an output power of the new energy generating unit to be below the output power limit; wherein an independent variable of the fifth function is the DC bus voltage, and a dependent variable of the fifth function is the output power limit of the new energy generating apparatus.

5. The method according to claim 4, wherein the fifth function is a monotone decreasing function.

6. The method according to claim 1, wherein the DC bus system further comprises a DC load coupled to the DC bus, and when the energy storage unit is configured to absorb power from the DC bus, the method further comprising:

unloading the DC load when the DC bus voltage is less than or equal to the fourth preset value.

7. The method according to claim 1, wherein when the energy storage unit is configured to output power to the DC bus, the first preset value Vref1 and the second preset value Vref2 satisfy:

$$Vref1=(1+K1)*Vp;$$

$$Vref2=(1+K2)*Vp;$$

wherein Vp represents a rated operational voltage of the DC bus, K1 and K2 represent any one value ranging from −30% to 30%, and K2 is greater than K1.

8. The method according to claim 1, wherein when the energy storage unit is configured to output power to the DC bus, the third preset value Vref3 satisfies:

$$Vref3=(1+K3)*Vref2$$

wherein Vref2 represents the second preset value of the energy storage unit, and K3 represents any one value ranging from 0 to 30%.

9. The method according to claim 1, wherein when the energy storage unit is configured to output power to the DC bus, the fourth preset value Vref4 satisfies:

$$Vref4=(1+K4)*Vref1$$

wherein Vref1 represents the first preset value of the energy storage unit, and K4 represents any one value ranging from 0 to 30%.

10. The method according to claim 1, wherein when the energy storage unit is configured to output power to the DC bus, the first function and the third function are monotone decreasing functions.

11. The method according to claim 1, wherein when the energy storage unit is configured to absorb power from the DC bus, the second function and the fourth function are monotone decreasing functions.

12. A system for controlling a DC bus voltage of a DC bus system, comprising:

a voltage master controller, coupled to the DC bus system and configured to adjust the DC bus voltage of the DC bus system based on a running state of the system;

an energy storage unit coupled to the DC bus system, comprising a power controller and a power unit, the power controller being configured to adjust one of output power and absorbing power of the power unit based on the DC bus voltage of the DC bus system;

wherein the power controller comprises:

a detector, configured to detect the DC bus voltage of the DC bus system;

a calculator, configured to determine a power reference value based on the DC bus voltage of the DC bus system; and a controller, configured to control an operating state of the power unit, and adjust the one of output power and absorbing power of the power unit based on the power reference value, and wherein when the energy storage unit is configured to output power to the DC bus system, the calculator is configured to:

determine the power reference value based on a first preset operating mode when the DC bus voltage of the DC bus s stem is greater than a first preset value and less than or equal to a second preset value;

determine the power reference value based on a first function when the DC bus voltage of the DC buss stem is greater than the second preset value and less than or equal to a third preset value; and determine the power reference value based on a third function when the DC bus voltage of the DC bus system is greater than a fourth preset value and less than or equal to the first preset value;

wherein independent variables of the first function and the third function are the DC bus voltage of the DC bus system, and dependent variables of the first function and the third function are an output power reference value of the energy storage unit; and when the energy storage unit is configured to absorb power from the DC bus system, the calculator is configured to:

determine the power reference value based on a second preset operating mode when the DC bus voltage of the DC bus s stem is greater than the first preset value and less than or equal to the second preset value;

determine the power reference value based on a second function when the DC bus voltage of the DC bus system is greater than the second preset value and less than or equal to the third preset value; and determine the power reference value based on a fourth function when the DC bus voltage of the DC bus system is greater than the fourth preset value and less than or equal to the first preset value;

wherein independent variables of the second function and the fourth function are the DC bus voltage of the DC bus system, and dependent variables of the second function and the fourth function are an absorbing power reference value of the energy storage unit.

13. The system according to claim 12, wherein when the energy storage unit is configured to output power to the DC bus, the calculator is further configured to:

determine the power reference value as a minimum preset output power when the DC bus voltage is greater than the third preset value; and determine the power reference value as a rated output power when the DC bus voltage is less than or equal to the fourth preset value.

14. The system according to claim 12, wherein when the energy storage unit is configured to absorb power from the DC bus, the calculator is further configured to:

determine the power reference value as a maximum preset absorbing power when the DC bus voltage is greater than the third preset value; and determine the power reference value as zero when the DC bus voltage is less than or equal to the fourth preset value.

15. The system according to claim 12, further comprising a new energy generating apparatus coupled to the DC bus, wherein when the energy storage unit is configured to output power to the DC bus, the calculator is further configured to:

limit the power reference value of the new energy generating apparatus to be below an output power limit calculated based on a fifth function when the DC bus voltage is greater than the third preset value, wherein an independent variable of the fifth function is the DC bus voltage, and a dependent variable of the fifth function is the output power limit of the new energy generating apparatus.

16. The method according to claim 15, wherein the fifth function is a monotone decreasing function.

17. The system according to claim 12, further comprising at least one of a DC load, wherein when the energy storage unit is configured to absorb power from the DC bus, the controller is configured to unload the at least one of the DC load when the DC bus voltage is less than or equal to the fourth preset value.

18. The system according to claim 12, wherein when the energy storage unit is configured to output power to the DC bus, the first preset value Vref1 and the second preset value Vref2 satisfy:

$$Vref1 = (1+K1)*Vp;$$

$$Vref2 = (1+K2)*Vp;$$

wherein Vp represents a rated operational voltage of the DC bus, K1 and K2 represent any one value ranging from −30% to 30%, and K2 is greater than K1.

19. The system according to claim 12, wherein when the energy storage unit is configured to output power to the DC bus, the third preset value Vref3 and the second preset value Vref2 satisfy:

$$Vref3 = (1+K3)*Vref2$$

wherein K3 represents any value ranging from 0 to 30%.

20. The system according to claim 12, wherein when the energy storage unit is configured to output power to the DC bus, the fourth preset value Vref4 satisfies:

$$Vref4 = (1-K4)*Vref1$$

wherein Vref1 represents the first preset value of the energy storage unit, and K4 represents any one value ranging from 0 to 30%.

21. The method according to claim 12, wherein when the energy storage unit is configured to output power to the DC bus, the first function and the third function are monotone decreasing functions.

22. The method according to claim 12, wherein when the energy storage unit is configured to absorb power from the DC bus, the first function, the second function and the fourth function are monotone decreasing functions.

* * * * *